Patented Dec. 9, 1952

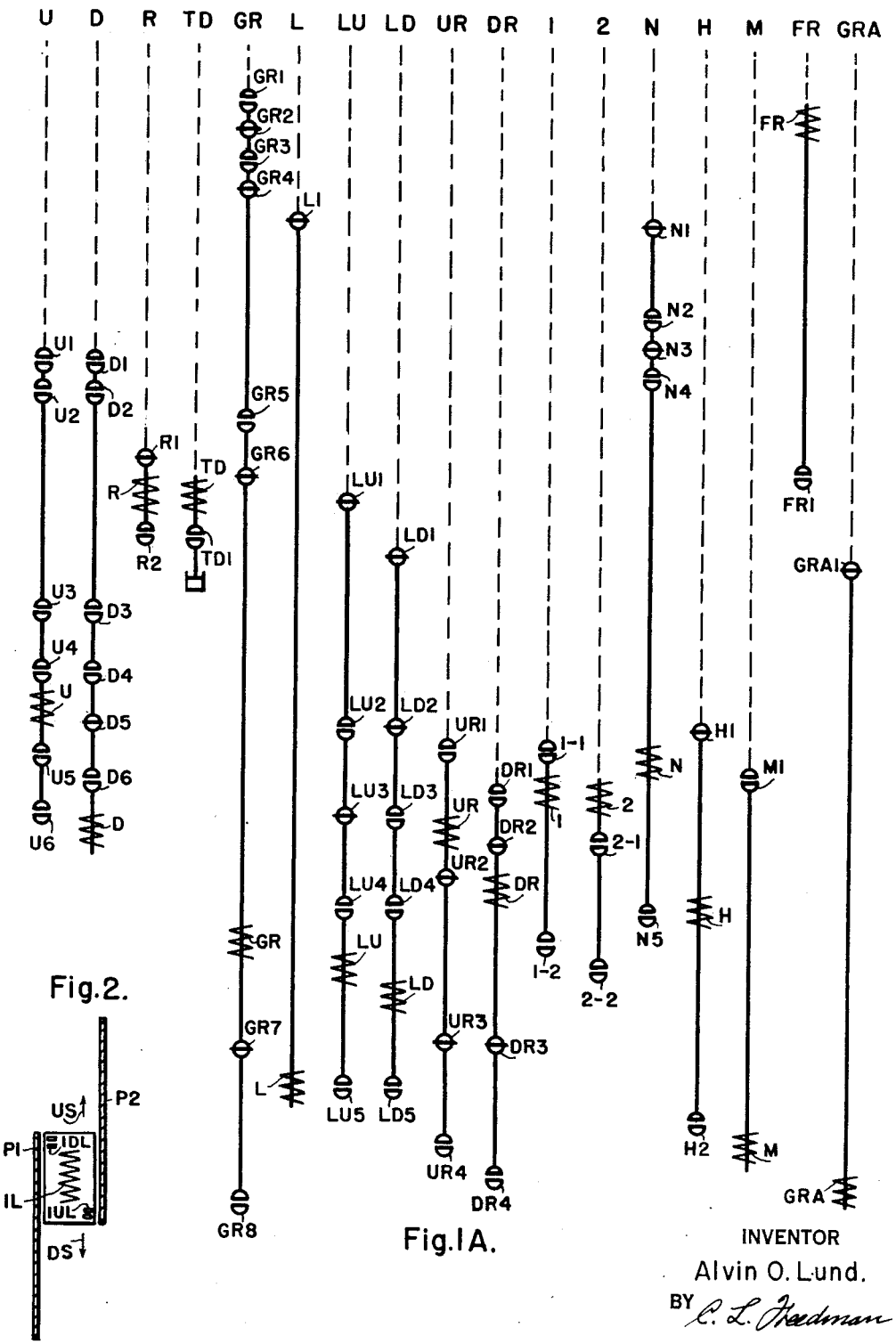

2,620,898

UNITED STATES PATENT OFFICE 2,620,898

ELEVATOR MOTOR CONTROL SYSTEM

Alvin O. Lund, East Orange, N. J., assignor to Westinghouse Electric Corporation, East Pittsburgh, Pa., a corporation of Pennsylvania Application May 26, 1950, Serial No. 164,313

11 Claims. (Cl. 187—29)

1

This invention relates to a motor control system, and it has particular relation to a variable voltage motor drive having accurately regulated speeds of operation.

In conventional variable voltage motor drives, it is often the practice to provide a plurality of accurately controlled speeds of operation. For example, in a variable voltage drive for an elevator system, provision may be made for full speed operation and for slow speed operation preparatory to stopping the car accurately at a desired floor.

In the Alvin O. Lund et al. application, Serial No. 47,558, filed September 3, 1948, and assigned to the assignee of the present patent application, which was issued May 16, 1950, as Patent 2,508,179, the generator of a variable voltage motor drive system is provided with two field windings. These fields are connected cumulatively for purposes of acceleration and full speed operation. The fields are connected differentially for slow speed operation.

One of the two field windings may be excited from a suitable source of direct current. This field winding is connected in shunt across the terminals of the generator armature. The remaining field winding is separately excited in accordance with an error voltage which represents the difference between the speed of the motor connected to the generator and a predetermined pattern or reference quantity. The excitation of the separately excited field is effected through one or more grid-controlled rectifiers, such as thyratrons. By connecting in the grid circuit of the thyratrons a resistor which is shunted by a capacitor, derivative damping is introduced for substantially eliminating hunting of the system.

For the purpose of determining the error voltage, a voltage responsive to motor speed is compared to a pattern or reference voltage. Both of these voltages may be adjustable. The voltage responsive to motor speed is derived through a circuit having a time constant for producing a smooth or gradual response of the system to a change in adjustment of the voltage.

In accordance with the invention, a system of the type disclosed in the aforesaid Alvin O. Lund et al. patent application is provided with a control for adjusting the acceleration of the motor. To this end a circuit having an adjustable time constant is employed for establishing the pattern or reference voltage. Adjustable deceleration also is provided.

The invention also contemplates the provision of a bias for the electronic tubes or thyratrons

2 which prevents operation of the motor at a high speed in the event that the system fails to operate normally. In addition continuous derivative damping is provided by provision of a continuously effective time-constant circuit for the voltage responsive to motor speed.

It is, therefore, an object of the invention to provide a motor control system including an adjustable time-constant circuit for controlling the rate of change of a pattern voltage employed for controlling an electric motor.

It is also an object of the invention to provide a motor control system including electronic control tubes which are biased to prevent undesired motor operation when the system fails to operate normally.

It is another object of the invention to provide an elevator system having a variable-voltage drive with an improved damping circuit.

It is an additional object of the invention to provide an elevator system having a variable-voltage drive with improved control of acceleration and deceleration.

Other objects of the invention will be apparent from the following discussion taken in conjunction with the accompanying drawings, in which:

Fig. 1A is a key diagram showing the coils and contacts of relays and switches utilized in the system of Fig. 1 in vertical alignment. By placing Figs. 1 and 1A in horizontal alignment, the vertical positions of contacts and relay or switch coils in Fig. 1 readily may be ascertained by reference to Fig. 1A.

Fig. 2 is a view in section with parts schematically shown of an inductor relay suitable for the system of Fig. 1.

Figure 1:
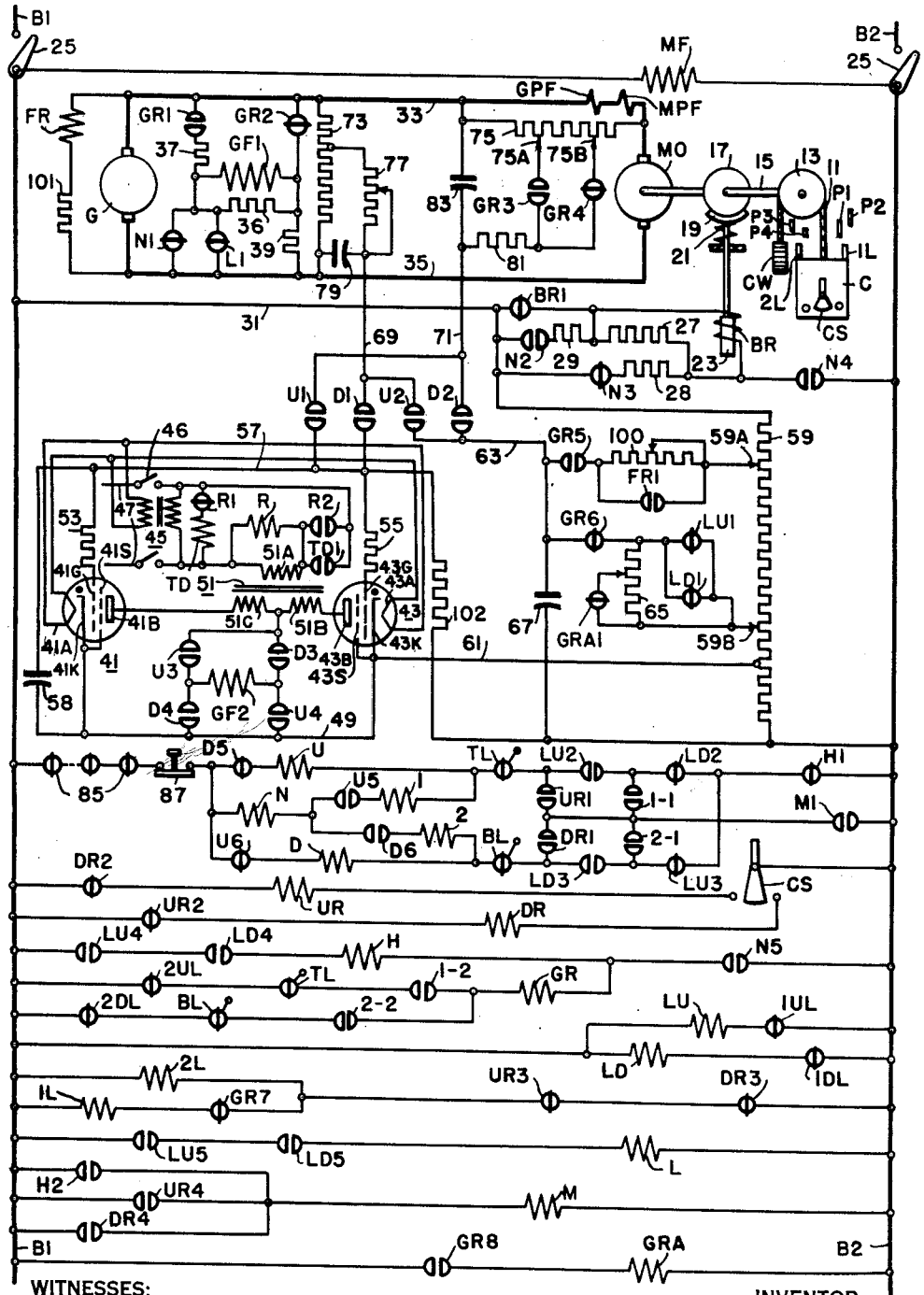
Figure 1 is a schematic view of an elevator system embodying the invention. The control circuits of Fig. 1 are illustrated in straight line form.

Referring to the drawings, Fig. 1 shows an elevator car C which is connected to a counterweight CW through a suitable flexible rope or cable 11 which passes around a sheave 13. The car C is intended for movement in a vertical direction to serve a plurality of floors in a building within which the elevator system is installed. In order to facilitate the accurate landing of the elevator car at a desired floor, various expedients known to the prior art may be employed. For the purpose of discussion, it will be assumed that the car C carries two inductor relays 1L and 2L. The inductor relay 1L is a leveling relay which cooperates with pairs of inductor plates P1 and P2 at each floor to level the car. The inductor relay 2L is intended to initiate deceleration of the elevator car at a predetermined distance from a desired floor at which the elevator car is to stop. To this end, the inductor relay 2L cooperates with inductor plates P3 and P4 which are mounted in the elevator hatch for each floor of the associated building. Such inductor relays and inductor plates are well known in the art. See, for example, the White et al. Patent 1,884,446.

The elevator car may be controlled in any suitable manner. For example, the elevator car may be provided with a car button for each floor of the building served by the elevator car and may be designed for full automatic control. For the purpose of discussion, however, it will be assumed that the elevator car C is controlled by a car switch CS mounted in the elevator car.

The sheave 13 is secured to a shaft 15 which is mounted for rotation about its axis by suitable means not shown. The shaft 15 carries a brake drum 17 and is designed to be rotated by a direct-current elevator motor MO.

The brake drum 17 has a brake shoe 19 biased into braking engagement with the drum by means of a coil spring 21. The brake shoe 19 is released from the brake drum 17 by means of a brake solenoid or coil BR having a magnetic armature 23 associated therewith. When the coil BR is energized, the brake shoe 19 is withdrawn from the drum 17 against the bias of the spring 21.

For energizing the various control circuits, a pair of buses B1 and B2 may be connected to a suitable source of direct current through switches 25. These buses are employed to energize various relays and switches. For the purpose of facilitating an understanding of the invention, the reference characters employed for designating certain of the switches and relays are listed as follows:

U=up direction switch
D=down direction switch
UR=up direction relay
DR=down direction relay
M=car running relay
N=auxiliary car running relay
GR=speed control relay
1L=leveling inductor relay
2L=slowdown inductor relay
LU=up leveling relay
LD=down leveling relay
H=holding relay
GRA=deceleration control relay
FR=acceleration control relay When contacts of a relay switch are referred to, they are designated by the reference character for the switch followed by a number indicating the specific contacts referred to.

Returning to the brake mechanism, it may be noted that the brake coil BR is shunted by a brake discharge resistor 27. When the brake is to be released, an auxiliary car running relay N is actuated to close its contacts N4. Closure of the contacts establishes an energizing circuit for the brake coil BR which may be traced from the bus B2 through the contacts N4, the brake coil BR and the resistor 27 in parallel, the break contacts BR1 of the brake and the conductor 31 to the bus B1. As the brake is released, it opens its contacts BR1 to introduce through contacts N2 a resistor 29 into the brake energizing circuit. This decreases the current flowing through the brake coil to a value merely sufficient to maintain the brake in released position.

Opening of the contacts N4 opens the energizing circuit for the brake coil BR. The brake coil dissipates its collapsing magnetic field rapidly through the high resistance discharge resistor 27 until the brake shoe has been partially reapplied. At this time, the back contacts BR1 reclose to connect the resistor 28 through the back contacts N3 across the brake coil. The resulting substantial decrease in the resistance connected across the brake coil slows or "softens" the remainder of the reapplication of the brake.

In order to energize the motor MO, a motor-generator set is provided which is represented by the commutator of the generator G. It will be understood that the generator in operation is rotated at a substantially constant speed by means of its associated motor. The generator G has its armature connected in a loop circuit with the armature of the motor MO by means of conductors 33 and 35. Interpole field windings GPF and MPF for the motor MO also are connected in the loop circuit for energization. The motor MO is provided with a single field winding MF which is connected between the buses B1 and B2.

Field excitation for the generator G is provided by two field windings GF1 and GF2. The field winding GF1 may be energized from any suitable source, but in a preferred embodiment of the invention, it is connected in shunt across the terminals of the armature of the generator G. A field discharge resistor 36 is connected across the field winding GF1. In order to improve the control of the elevator motor, the field winding GF1 is arranged to be reversibly connected across the armature of the generator G. To this end, contacts GR1 and GR2 of a speed control relay GR are provided, together with contacts L1 of an auxiliary relay and contacts N1 of an auxiliary car running relay N. With the contacts in the positions illustrated in Fig. 1, the generator field winding GF1 is connected between the conductors 33 and 35 through a circuit which may be traced from the conductor 33 through the contacts GR2, the generator field winding GF1 and the contacts N1 and L1 to the conductor 35. The resistor 36 also is in shunt with the field winding GF1. When the contacts GR2, N1 and L1 are open, the contacts GR1 are closed to connect the generator field winding GF1 across the conductors 33 and 35 in a reverse direction for the purpose of reversing the field produced by this winding. Resistors 37 and 39 may be provided for the purpose of controlling the magnitude of the energization of the winding GF1.

The second generator field winding GF2 may be referred to as a regulating field winding, and the current supplied thereto is controlled for the purpose of accurately controlling the speed of the motor MO. The field winding GF2 may be energized from any suitable controllable source, but in a preferred embodiment of the invention it is energized through one or more grid-controlled tubes from a source of alternating current. In order to provide full-wave rectification of the alternating current, preferably two grid-controlled rectifier tubes 41 and 43 are provided. These are of the gaseous-discharge type known as thyratrons. The thyratrons are illustrated as of the indirectly-heated-cathode type having heaters 41A and 43A which are connected for energization from the secondary winding of a transformer 45. The primary winding of the transformer 45 is connected through a switch 46 to a source of alternating current represented by conductors 47. The cathodes 41K, 43K and shield grids 41S, 43S of the thyratrons are connected to each other through a conductor 49.

The rectifier of Fig. 1 may be a polyphase rectifier, if so desired. However, for the purpose of simplicity, it is illustrated as a single-phase full-wave rectifier. Plate voltage for the thyratrons 41 and 43 is supplied from the conductors 47 through a transformer 51. The primary winding 51A of this transformer is connected to the terminals 47 after a time delay has elapsed sufficient to permit adequate heating of the heaters 41A and 43A. To this end, a time delay relay TD is connected across the primary winding of the transformer 45 through back contacts R1 of a holding relay R. The time delay relay TD has a time delay in operation sufficient to permit adequate heating of the heaters 41A and 43A. At the expiration of its time delay, the relay TD operates to close its contacts TD1. This connects the primary winding 51A and the holding relay R in parallel across the primary winding of the transformer 45. The holding relay R promptly operates to close its contacts R2, thereby establishing a holding circuit across the contacts TD1. The holding relay also opens its contacts R1 to deenergize the time delay relay TD. Because of such deenergization, the full time delay of the relay TD is available should a subsequent interruption of power occur.

The tubes 41 and 43 have their plates or anodes 41B and 43B connected respectively to the terminals of the secondary winding 51B of the transformer 51. This secondary winding is provided with a center tap 51C. The generator field winding GF2 is reversibly connected between the center tap 51C and the conductor 49. For example, when the contacts U3 and U4 of the up direction switch U are closed, the generator field winding GF2 is connected with proper polarity to produce movement of the elevator car C in an up direction. Conversely, when the contacts D3 and D4 of the down direction switch are closed, the generator field winding GF2 is connected with proper polarity to produce downward travel of the elevator car C.

The outputs of the thyratrons are controlled by means of the thyratron control grids 41G and 43G. These grids are connected respectively through resistors 53 and 55 to a conductor 57. Operation of the thyratrons may be improved by connecting a capacitor 58 between the conductors 49 and 57. It will be understood that the voltage applied between the conductors 49 and 57 controls the firing of the thyratrons.

An error voltage is applied between the conductors 49 and 57 for the purpose of controlling the output of the thyratrons. This error voltage represents the difference between a speed voltage, which represents the speed of the motor MO, and a pattern voltage, which determines the desired speed of the motor. The pattern voltage conveniently may be obtained from a voltage divider or resistor 59 which is connected between the buses B1 and B2. The pattern voltage derived from the voltage divider appears between a conductor 61, which is connected to the conductor 49, and a conductor 63. The conductor 61 is connected to a fixed point on the voltage divider 59. The conductor 63 is connected through front contacts GR5 of the speed control relay GR and an adjustable resistor 100 to an adjustable tap 59A on the voltage divider to provide a pattern voltage suitable for acceleration and full-speed operation of the motor MO. After the generator voltage output has built up to a substantial value, front contacts FR1 of an acceleration control relay close to shunt the resistor 100. This permits an increase in acceleration of the motor which rapidly reaches full speed. By providing these two accelerating steps, the peak acceleration currents and the peak torque rating of the variable-voltage drive may be materially reduced. The relay FR is connected across the armature of the generator G through a resistor 101 and may be designed to pick up when the output voltage of the generator reaches a predetermined value such as 80% of maximum.

For slow speed operation, the conductor 63 is connected through back contacts GR6 of the speed control relay to an adjustable tap 59B on the voltage divider. This connection may be effected either through a resistor 65 or through one of two sets of contacts LU1 and LD1. These are contacts of the up leveling and down leveling relays. It will be understood that adjustment of the tap 59A adjusts the full speed of the motor MO whereas adjustment of the tap 59B adjusts the low speed of the motor. The tap 59B may be adjusted to a point on the voltage divider which is negative relative to the conductor 61 if so desired.

When the speed control relay GR drops out the rate of deceleration may be adjusted by adjustment of the value of resistance of the resistor 65. To this end an adjustable shunt is established for a portion of the resistor 65 through back contacts GRA1 of a deceleration control relay GRA. This relay GRA is energized through front contacts GR8 of the speed control relay GR.

The relay GRA has a time delay in drop out which may be of the order of 0.1 to 0.2 second. Consequently, when the relay GR drops out the effective new pattern voltage is determined in part by the entire resistor 65 for 0.1 to 0.2 second. When the relay GRA finally drops out only a small part of the resistor 65 is effective and the effective pattern voltage is more quickly lowered towards the value determined by the tap 59B. Thus a smooth, comfortable initiation of slow-down is obtained. As representative of suitable performance, the deceleration of the elevator car during the interval between the drop outs of the relays GR and GRA may be of the order of one-half the value obtained after the drop out of the relay GRA.

An energy storage device or a capacitor 67 is connected between the negative terminal of the voltage divider and the conductor 63. The capacitor is connected to a point on the voltage divider which is negative with respect to the conductor 61. The capacitor 67 and the resistor 65 have a time constant which makes gradual and smooth the transition of the pattern voltage from the high speed value to the low speed value. The resulting deceleration of the elevator car is smooth. The delay in reaching the new voltage or the time constant depends on the value of resistance and capacitance employed.

When the relay GR drops out the slope of the deceleration pattern (speed relative to time) is determined by the time constant of the capacitor 67 and a resistance value which includes the resistance of the entire resistor 65. When the relay GRA drops out the slope is increased to correspond to a shorter time constant because of the shunting of a portion of the resistor 65.

It will be recalled that the pattern voltage is compared to a speed voltage representing the speed of the motor MO. This speed voltage may be obtained from a tachometer generator mounted on the shaft 15, as pointed out in the Martin et al. Patent 2,313,955. However, it is preferable to obtain the speed voltage directly from the motor MO. One system for obtaining a speed voltage from the motor of a variable voltage drive is disclosed in the King Patent 2,389,367.

In the embodiment of Fig. 1, a speed voltage representing the speed of the motor MO is applied between conductors 69 and 71. The conductor 69 is connected to a tap on a voltage divider or resistor 73 which in turn is connected across the conductors 33 and 35 of the loop. The voltage across the voltage divider 73 represents the generator output voltage. The voltage across the voltage divider 73 differs from the counter-electromotive force or speed voltage of the motor MO by a factor dependent on the resistance drop in the interpole field windings and in the armature of the motor MO resulting from load current flowing therethrough. For this reason, the voltage derived from the voltage divider 73 is compensated by a suitable compensating voltage to obtain the desired resultant speed voltage. The compensating voltage may be derived from a resistor connected in the loop circuit. However, it has been found that a suitable compensating voltage may be derived from a resistor or voltage divider 75 which is connected in parallel with the interpole field windings GP and MP the voltage divider 75 has a current flowing therethrough which is proportional to the load current supplied to the motor MO. The compensating voltage is introduced by connecting the conductor 71 to an adjustable tap 75A on the voltage divider 75 through front contacts GR3 of the speed control relay GR. When the contacts GR3 are closed, portions of the voltage dividers 73 and 75 are connected differentially in series to provide a speed voltage between the conductors 69 and 71, which represents accurately the speed of the motor MO.

The voltage between the conductors 69 and 71 is connected differentially in series with the voltage across the conductors 63 and 61 to apply between the conductors 57 and 49 an error voltage which represents the deviation in speed of the motor MO from that represented by the pattern voltage between the conductors 61 and 63. Since the polarity of the voltage between the the conductors 69 and 71 reverses in response to a reversal in the polarity of the generator G, the speed voltage is connected to the pattern voltage through a reversing switch represented by the contacts U1 and U2 of the up direction switch and the contacts D1 and D2 of the down direction switch. When the system is conditioned for upward travel of the elevator car, the contacts U1 and U2 are closed. When the elevator car is conditioned for downward travel, the contacts D1 and D2 are closed. This assures differential connection of the speed and pattern voltages for both conditions of operation.

The capacitor 79 and the resistor 77 provide first derivative damping to oppose any tendency of the system to hunt. In response to any change in the voltage between the conductors 33 and 35, the resulting change in the voltage across the voltage divider 73 causes a capacitor charging or discharging current to flow through the resistor 77. Such current produces a voltage drop across the resistor 77 which changes the bias applied between the grids and cathodes of the thyratrons. If the capacitor 79 is connected between the conductor 69 and the proper one of the conductors 33 and 35, the consequent change in the energization of the regulating field winding GF2 is in a direction opposing the change in voltage between the conductors 33 and 35. Consequently, the capacitor 79 and resistor 77 compensate for any tendency of the system to hunt.

The compounding or voltage requirements of motors may differ for different motors and for different speeds of a given motor. Therefore, when the speed of the motor MO is changed, it may be desirable to change the compounding of the regulator system. For example, some conventional elevator motors require more com-compounding in the regulator system at landing speed than at high speed. Such a change may be introduced by connecting the conductor 71 to an adjustable tap 75B on the voltage divider 75 when the back contacts GR4 close. It will be observed that the tap 75B incorporates a larger portion of the compensating voltage appearing across the voltage divider 75 and consequently decreases the magnitude of the voltage which appears across the conductor 69 and 71. The tap 75B has a compounding effect higher than that of the tap 75A.

In order to decrease the shock introduced by the sudden transition from the voltage represented by the tap 75A to that represented by the tap 75B, a predetermined time delay in the transition between the voltages is introduced. Such time delay may be provided by introducing a resistor 81 between the conductor 71 and the tap 75B, and by introducing a capacitor 83 between the conductors 71 and 33. When the contacts GR3 open, the resulting increase in the voltage across the capacitor 83 results in the flow of substantial charging current to the capacitor through the resistor 81. The charging current and the voltage drop across the resistor 81 decrease at a rate dependent on the time constant of the charging circuit. Inasmuch as the voltage drops across the voltage divider 75 and the resistor 81 are in opposition, the opening of the contacts GR3 results in a gradual change in the speed voltage to its new value. Also, the resistor 81 and the capacitor 83 introduce substantial second-derivative damping for the system. This damping tends to smooth out any irregularities in speed otherwise resulting from intermittent firing of the thyratrons.

It should be noted that the resistor 81 is located not only between the conductor 71 and the contacts GR4, but also between the conductor 71 and the contacts GR3. Consequently when the contacts GR3 are closed the resistor 81 and the capacitor 83 are still effective for providing second derivative damping. This second-derivative damping is available at all times to improve the stability of the elevator motor.

Turning now to the control circuits for the various relays and switches, it will be observed that the car switch CS may be operated in a clockwise direction from the neutral position illustrated in Fig. 1 to energize an up direction relay UR or in a counterclockwise direction to energize a down direction relay DR. The up direction relay UR by closure of its contacts UR1 conditions the up direction switch U for subsequent energization. In a similar manner, the down direction relay by closure of the contacts DR1 conditions the down direction switch D for subsequent closure. The control circuits for the up and down direction switches also include contacts LD2, LD3, LU2 and LU3 of leveling relays LU and LD. These will be discussed later.

Operation of either of the relays UR or DR results in energization of a car running relay M which closes its contacts M1 to complete an energizing circuit for the selected up switch or down switch U or D. When either of these switches is operated, an auxiliary car running relay N also is energized. In addition, a holding relay 1 or 2 is energized for the purpose of establishing a holding circuit for either the up direction switch U or the down direction switch D.

When either the up direction relay UR or the down direction relay DR is energized, back contact UR3 and DR3 are open to deenergize the leveling inductor relay 1L and the slowdown inductor relay 2L.

As a result of energization of the auxiliary car running relay N, contacts N5 close to energize a holding relay H and the speed control relay GR. The holding relay when energized establishes a holding circuit for the car running relay M and, under certain conditions when deenergized, establishes a holding circuit for either the up direction switch U or the down direction switch D, depending upon which is energized. The speed control relay GR operates various contacts for the purpose of determining the speed of the motor MO.

Various conventional safety devices, such as top limit switches TL, bottom limit switches BL and door safety switches 85, are provided. One of the door safety switches may be employed for each floor or hall door, and for the elevator door. Each safety switch is open when its associated door is open. A manually operable switch 87 also may be provided for preventing energization of the up and down direction switches.

It is believed that the control system can best be described by analyzing its operation during the travel of the elevator car. Let it be assumed initially that the car C is at the first floor and that it is desired to move the car C from the first floor to the third floor of the associated building. The operator first closes his car door and the hall door on the first floor, and then rotates his car switch CS in a clockwise direction to energize the up direction relay UR. The energizing circuit is B1, DR2, UR, CS, B2. In response to its energization, the up direction relay UR closes its front contacts UR1 to condition the up direction switch U for subsequent energization. Also, the back contacts UR2 open to prevent energization of the down direction relay DR. Opening of the back contacts UR3 deenergizes the leveling inductor relay 1L and the slowdown inductor relay 2L. Finally, closure of the front contacts UR4 energizes the car running relay M.

At this stage of the operation, the contacts 2UL and 2DL of the slow down inductor relay are closed. The contacts 1UL and 1DL of the leveling inductor relay also are closed. It is believed that the construction and operation of the inductor relays are well known. As well understood in the art, an inductor relay has an energizing winding which when energized is ineffective to actuate its associated contacts unless the inductor relay, which is mounted on the elevator car, is adjacent a magnetic inductor plate which is mounted in the elevator hatch. Inductor plates are positioned in the hatch for each floor to actuate appropriate inductor relay contacts at predetermined distances from the desired floor.

To facilitate an understanding of the inductor relay, reference may be made to Fig. 2 wherein the inductor relay 1L is illustrated. It is assumed that the car is accurately located at its first floor landing. With the car so located, the inductor relay 1L mounted on the car is located between the two inductor plates P1 and P2 for the first floor, which are secured in the hatch. If the winding of the inductor relay 1L is energized, the contacts 1DL and 1UL are open for the reason that the inductor plates P1 and P2 complete the magnetic circuits for actuating the contacts 1DL and 1UL. If the car were to move in an upward direction represented by the arrow US for a predetermined distance, such as three-quarters of an inch, the plate P1 would fail to complete the magnetic circuit for the contacts 1DL, and these contacts would close, even though the winding of the inductor relay 1L remained energized. Conversely, if the elevator car were to move in a downward direction as represented by the arrow DA for a predetermined distance, such as three-quarters of an inch, from the position illustrated in Fig. 2, the plate P2 would fail to complete its magnetic circuit, and the contacts 1UL would close, even though the winding of the relay 1L remained energized. An inductor relay of this general type will be found in the Santini Patent 2,298,174.

Inasmuch as the up leveling relay LU is energized, its contacts LU1 and LU3 are open, and its contacts LU2, LU4 and LU5 are closed. Similarly, inasmuch as the down leveling relay LD is energized, the contacts LD1 and LD2 are open, and the contacts LD3, LD4 and LD5 are closed. Since both contacts LU5 and LD5 are closed, the auxiliary relay L is energized, and its back contacts L1 are open.

Returning now to the car running relay M, it will be noted that closure of the contacts M1 energizes the up direction switch through the circuit,

B1, 85, 87, D5, U, TL, UR1, M1, B2

The up direction switch U closes its front contacts U1 and U2 to connect a speed voltage appearing between the conductors 69 and 71 with proper polarity relative to the pattern voltage appearing between the conductors 61 and 63. The contacts U3 and U4 close to connect the regulating field GF2 with proper polarity for upward travel of the elevator car C. The contacts U6 open to prevent energization of the down direction switch D.

Closure of the front contacts U5 of the up direction switch connects the holding relay 1 and the auxiliary car running relay N for energization in parallel with the up direction switch U. The holding relay 1 closes its front contacts 1—1 to establish a holding circuit in cooperation with the contacts LU2 across the contacts UR1 of the up direction relay. The holding relay also closes its contacts 1—2 to prepare the speed control relay GR for energization.

In response to energization of the auxiliary car running relay, the back contacts N1 open to disconnect the generator field winding GF1 from the conductor 35. The contacts N4 close to release the brake shoe 19 from the brake drum 17 in the manner previously discussed. The contacts N5 close to energize the holding relay H through the circuit,

B1, LU4, LD4, H, N5, B2

In addition, the speed control relay GR is energized through the circuit,

B1, 2UL, TL, 1—2, GR, N5, B2

Energization of the holding relay H opens back contact H1. This has no immediate effect on the operation of the elevator system. In addition, contacts H2 close to establish a holding circuit for the car running relay M around the contacts UR4.

Energization of the speed control relay GR opens the back contacts GR2 and closes the front contacts GR1 to connect the generator field winding GF1 across the conductors 33 and 35 with proper polarity to act cumulatively with the regulating field winding GF2. The front contacts GR3 close for the purpose of applying the desired motor speed voltage between the conductors 69 and 71. The back contacts GR4 open to disconnect the tap 75B from the resistor 81. The contacts GR5 close to connect the conductor 63 to the tap 59A through the resistor 100 for the purpose of applying the correct pattern voltage between the conductors 61 and 63. It will be understood that the effective pattern voltage increases at a rate determined by time constant of the capacitor 67 and a resistance comprising the effective resistance of the resistor 109. The back contacts GR6 of the speed control relay open at this time for the purpose of disconnecting the conductor 63 from the tap 59B. The back contacts GR7 open but have no immediate effect on the operation of the system.

Closure of the front contacts GR8 results in energization of the deceleration control relay GRA at this time. The relay GRA opens its back contacts GRA1 to render effective for subsequent retardation the entire resistor 65.

Since the pattern voltage appearing between the conductors 61 and 63 is opposed by a zero motor speed voltage, a substantial error voltage is applied between the grids and cathodes of the thyratrons, and substantial excitation is applied to the regulating field winding GF2. Inasmuch as the pattern voltage increases at a predetermined rate due to the aforesaid time constant, excessive excitation and excessive accelerations are avoided. As the generator voltage increases, the generator field winding GF1 is excited to assist the regulating winding GF2. Also when the generator output voltage reaches a predetermined voltage, such as 80% of maximum the relay FR picks up to close its contacts FR1. These contacts shunt the resistor 100 and place maximum pattern voltage between the conductors 61 and 63.

The motor speed voltage appearing between the conductors 69 and 71 increases as the motor MO picks up speed. Consequently, the error voltage applied between the grids and cathodes of the thyratrons decreases until the elevator car reaches full speed. At this time, the thyratrons provide sufficient excitation to maintain the elevator car at the desired full speed.

If the operator desires to stop his car at the third floor of the building, he centers his car switch CS after passing the second floor, and consequently he de-energizes the up direction relay UR. The contacts UR1 promptly open, but since they are by-passed by the contacts 1—1 and LU2 in series, the opening of the contacts UR1 has no immediate effect on the operation of the system. The contacts UR2 reclose to condition the down direction relay DR for subsequent energization.

Closure of the back contacts UR3 energizes the slowdown inductor relay 2L through the circuit,

B1, 2L, UR3, DR3, B2

However, the contacts of the slowdown inductor relay cannot operate until the inductor relay reaches its associated up direction inductor plate for the third floor. The slowdown inductor relay mounted on the car reaches its associated up direction inductor plate at the third floor when the elevator car is at a predetermined distance, such as three feet from the third floor (this distance may be suitable, for example, for an elevator car having a full speed of the order of 200 feet per minute).

When the slowdown inductor relay reaches the associated inductor plate for the third floor, its up direction contacts 2UL open to deenergize the speed control relay GR. The speed control relay promptly closes its contacts GR7 to energize the leveling inductor relay 1L. However, the contacts of the leveling inductor relay 1L cannot operate until the inductor relay 1L reaches its associated inductor plates for the third floor.

Contacts GR1 open to disconnect the generator field winding GF1 from the associated conductors 33 and 35. Back contacts GR2 close but do not establish a complete connection for the generator field winding GF1 for the reason that the back contacts N1 and L1 still remain open.

The front contacts GR5 open to disconnect the conductor 63 from the tap 59A. Back contacts GR6 close to connect the conductor 63 to the tap 59B through the resistor 65. Also, the contacts GR3 open and the contacts GR4 close to transfer the connection of the conductor 71 to the tap 75B. The change in the pattern voltage corresponding to the change from the tap 59A to the tap 59B, is gradual because of the delay action introduced by the capacitor 67 and resistor 65. In response to the change in pattern voltage and the consequent change in field excitation of the generator G, the motor MO decelerates, and the elevator car approaches gradually its landing speed.

The opening of contacts GR8 deenergizes the deceleration control relay GRA and this relay starts to time out. After a delay which may be of the order of 0.1 to 0.2 second the relay GRA drops out to close its back contacts GRA1. This closure shunts a portion of the resistor 65 and the pattern voltage continues to approach its landing value at a faster rate determined by the time constant of the capacitor 67 and the effective portion of the resistor 65.

At a predetermined distance from the third floor (such as seven inches), the leveling inductor relay reaches its inductor plate P1 for the third floor, and the contacts 1DL of the leveling inductor relay open to reenergize the down leveling relay LD. The down leveling relay closes its contacts LD1 to shunt the resistor 65. Because of the time constant of the resistor 65 and the capacitor 67, the elevator car speed approaches its landing value at an exponential rate, with respect to time. The final 10% of the decay in speed occurs very slowly. However, the shunting of the resistor 65 by the contacts LD1 definitely forces the elevator car to the desired landing speed. The contacts LD2 close but have no immediate effect on the operation of the system. The contacts LD3 open but again have no effect on the immediate operation of the system. The contacts LD4 open to deenergize the holding relay H. Finally, the contacts LD5 open to deenergize the auxiliary relay L.

The relay L closes its back contacts L1 to complete a connection of the generator field winding GF1 across the conductors 33 and 35 through the back contacts GR2 with proper polarity for opposing the field produced by the generator field winding GF2. The parameters of the circuits may be such that the generator field winding GF1 produces twice the value of the resultant magnetomotive force required for the generator, whereas the generator field winding GF2 produces approximately three times the resultant magnetomotive force required by the generator. Since these field windings are differentially associated, the net field excitation of the generator is equal to the desired value. At the same time, the thyratrons operate at a level sufficiently high to assure stable operation thereof. With the field windings differentially connected, the regulator forces the motor and car speed to follow the pattern established by the pattern voltage.

Inasmuch as the holding relay H has been deenergized, its back contacts H1 close to establish with the contacts LD2 and 1—1 a holding circuit around the contacts M1. The opening of the contacts H2 deenergize the car running relay M, but the resultant opening of the contacts M1 has no effect immediately on the operation of the system because of the aforesaid holding circuit therearound.

The differential connection of the generator field windings in cooperation with the change in the values of the pattern and speed voltages results in the continued approach to the third floor of the elevator car at a predetermined slow landing speed. At approximately three-quarters of an inch from the floor, the leveling inductor relay IL reaches the inductor plate P2 for the third floor to open its contacts IUL. The contacts in opening deenergize the up leveling relay LU. The resulting closure of the contacts LU1 and LU3 has no immediate effect on the operation of the system. The opening of the contacts LU4 and LU5 also has no immediate effect on the operation of the system. However, the opening of the contacts LU2 results in deenergization of the relays U, N and I. The holding relay I opens its contacts I—1 and I—2 without further effect on the system. The up direction switch U opens its contacts U1 and U2 to disconnect the speed voltage from the thyratron system. The contacts U3 and U4 open to disconnect the generator field winding GF2 from the thyratron circuit. The contacts U5 open but have no immediate effect on the operation of the system. The contacts U6 close to condition the down direction switch D for subsequent energization.

The deenergization of the auxiliary car running relay N results in closure of the contacts N1. Because the generator field winding GF1 acts in opposition to the resultant generator field, upon the disconnection of the generator field winding GF2, the generator field winding GF1 rapidly reduces the voltage output of the generator G and effectively kills any residual magnetism in the generator. The opening of the contacts N4 results in re-application of the brake shoe 19 to the drum 17 to bring the car to a stop accurately at the third floor. The opening of the contacts N5 has no immediate effect on the operation of the system but merely conditions it for subsequent operation.

Should the car overrun the third floor by a predetermined distance, such as three-quarters of an inch, the leveling inductor relay IL leaves its associated plate P1 sufficiently to result in closure of the contacts IDL. These contacts in closing energize the down leveling relay LD. The contacts LD3 establish a circuit for the down direction switch D as follows:

B1, 85, 87, U6, D, BL, LD3, LU3, H1, B2

The down direction switch closes its contacts D1 and D2 to connect the speed voltage between the conductors 69 and 71 in proper polarity relative to the pattern voltage occurring between the conductors 61 and 63. The contacts D3 and D4 close to connect the generator field winding GF2 with proper polarity for downward travel of the elevator car. The contacts D5 open to prevent subsequent energization of the up direction switch U. The contacts D6 close to connect the holding relay 2 and the auxiliary car running relay N in parallel with the down direction switch D for energization. The holding relay 2 closes its contacts 2—1, but this has no effect on the operation of the system. Also, the holding relay 2 closes its front contacts 2—2 to prepare the speed control relay GR for energization.

The auxiliary car running relay N opens its contacts N1, but this has no immediate effect on the operation of the system. Contacts N4 close to release the brake in a manner previously discussed. The contacts N5 close, but such closure does not result in energization of the speed control relay GR for the reason that the contacts 2DL remain open. The relay H remains deenergized for the reason that the contacts LU4 remain open. Since the pattern voltage has substantially zero motor speed voltage opposing it, a substantial error voltage is applied to the thyratrons, and the generator field winding GF2 is energized to move the car in a downward direction. In its downward travel, the leveling inductor relay IL again reaches a position relative to its associated inductor plate P1 wherein the contacts IDL again open. Such opening deenergizes the down leveling relay LD which opens its contacts LD3 to deenergize the down direction switch D, the holding relay 2 and the auxiliary car running relay N. The holding relay 2 opens its contacts 2—1 and 2—2, but these have no immediate effect on the operation of the system. The down direction switch D opens its contacts D1 and D2 to disconnect the speed voltage from the thyratron circuit. The contacts D3 and D4 open to disconnect the generator field winding GF2 from the thyratron circuit. The contacts D5 and D6, respectively, close and open to restore the system for further operation.

The auxiliary car running relay N, when deenergized, closes its contacts N1, but this has no immediate effect on the operation of the system. The contacts N4 open to permit reapplication of the brake in a manner previously discussed. The contacts N5 open, and the remaining contacts of the relay LD are actuated to restore the system for further operation without producing any immediate effect thereon. The car now is accurately located at the third floor.

Next it will be assumed that the elevator operator is desirous of returning the elevator car from the third floor to the first floor of the building in which the elevator system is installed. After closing the hall and car doors, he actuates the car switch CS in a counterclockwise direction to establish the following circuit for the down direction relay DR:

B1, UR2, DR, CS, B2

In response to its energization, the down direction relay closes its front contacts DR1 to condition the down direction switch D for subsequent energization. Opening of the contacts DR2 prevents energization of the up direction relay UR. Opening of the back contacts DR3 deenergizes the leveling relay 1L and the slowdown inductor relay 2L. Closure of the contacts DR4 energizes the car running relay M.

With the inductor relays deenergized, the contacts 2UL and 2DL are closed, and the contacts 1UL and 1DL also are closed. The leveling relays LU and LD are both energized which means that the contacts LU1, LD1, LU3 and LD2 are open, whereas the contacts LU2, LU4, LU5, LD3, LD4 and LD5 are all closed.

When the contacts M1 of the car running relay close, the down direction switch D is energized through the circuit

B1, 85, 87, U6, D, BL, DR1, M1, B2

The contacts D1 and D2 close to connect the source of speed voltage represented by the conductors 69 and 71 with proper polarity to the source of pattern voltages represented by the conductors 63 and 61 for downward travel of the elevator car. The contacts D3 and D4 close to connect the generator field winding GF2 with proper polarity for downward travel of the elevator car. The back contacts D5 open to prevent subsequent energization of the up direction switch U. The front contacts D6 close to connect the holding relay 2, and the auxiliary car running relay N in parallel with the down direction switch D for energization.

The holding relay 2 closes its contacts 2—1 to establish through the contacts LD3 a holding circuit around the contacts DR1. In addition, the contacts 2—2 are closed to prepare the speed control relay GR for energization.

Energization of the auxiliary car running relay N opens its back contacts N1. Since the contacts L1 also are open because the relay L is in energized condition, the field winding GF1 is disconnected from the conductor 35. The contacts N4 close to release the elevator brake in the manner previously described. The contacts N5 close to energize the speed control relay GR through the circuit

B1, 2DL, BL, 2—2, GR, N5, B2

In addition, the holding relay H is energized through the circuit

B1, LU4, LD4, H, N5, B2

The relay H closes its front contacts H2 to establish a holding circuit for the car running relay M and opens its back contacts H1.

The speed control relay GR operates in exactly the same manner discussed with reference to upward travel of the elevator car. However, since the action of the down direction switch D has conditioned the elevator car for down travel, the elevator car moves in a down direction and reaches its full speed. The relays FR and GRA also operate in the manner previously described.

In order to stop at the first floor, the car operator may center his car switch CS as he passes the second floor. The resulting deenergization of the down direction relay DR opens the front contacts DR1, but since these contacts are shunted by the contacts 2—1 and LD3, such opening does not affect the operation of the system. The contacts DR2 close to prepare the up direction relay UR for subsequent energization. The contacts DR3 close to energize the slowdown inductor relay 2L through the circuit

B1, 2L, UR3, DR3, B2

The contacts DR4 open but are by-passed by the closed contacts H2.

The energization of the winding of the slowdown inductor relay 2L has no effect until the car is within the predetermined distance, such as three feet, from the first floor. At this point, the inductor relay cooperates with its associated inductor plate at the first floor to open its down direction contacts 2DL. This results in deenergization of the speed control relay GR.

The speed control relay GR and the relay GRA operate in exactly the same manner discussed with reference to the slowing down of the elevator car as it approaches the third floor during up travel to slow down the elevator car C as it approaches the first floor.

The closing of the contacts GR1 results in energization of the leveling inductor relay 1L. When the elevator car is within a predetermined distance from the first floor, such as seven inches, the inductor relay 1L cooperates with its associated inductor plate P2 to open the contacts 1UL. These contacts in opening deenergize the up leveling relay LU. The contacts LU1 close to shunt the resistor 65. Contacts LU2 open, and contacts LU3 close without immediately effecting the operation of the system. Contacts LU4 open to deenergize the holding relay H, and contacts LU5 open to deenergize the relay L.

As a result of deenergization of the relay L, the contacts L1 close to connect the generator field winding GF1 across the conductors 33 and 35 with proper polarity to produce a magnetomotive force opposing that produced by the generator field GF2. The resulting differential field operates in the same manner discussed with reference to the travel of the up traveling car within seven inches of the third floor to produce a slow landing speed for the elevator car.

The deenergization of the relay H closes the contacts H1, which cooperate with the contacts LU3 to establish a holding circuit around the contacts M1. The contacts H2 open to deenergize the car running relay M which opens its contacts M1. However, since the contacts M1 have a by-pass circuit therearound, their opening has no immediate effect on the operation of the system.

When the down traveling elevator car is within a predetermined distance, such as three-quarters of an inch, from the first floor, the leveling inductor relay cooperates with the associated inductor plate P1 for the first floor to open its contacts 1DL. As a result, the down leveling relay LD is deenergized. The contacts LD1 and LD2 are closed, whereas the contacts LD3, LD4 and LD5 are opened. Closure of the contacts LD1 and LD2 has no immediate effect on the operation of the system. Opening of the contacts LD3 deenergizes the down direction switch D, the holding relay 2 and the auxiliary car running relay N. The holding relay 2 opens its contacts 2—1 and 2—2 without effecting the immediate system operation. The down direction switch D opens its contacts D1 and D2 to disconnect the conductors 69 and 71 from the associated conductors 57 and 63. The contacts D3 and D4 open to isolate the generator field winding GF2. The contacts D5 close and the contacts D6 open to condition the system for subsequent operation.

The deenergization of the auxiliary car running relay N closes the back contacts N1 and opens the front contacts N4. Opening of the latter contacts results in application of the brake to bring the elevator car to an accurate stop at the first floor. During the stop, the generator field winding GF1 remains energized in a direction to kill any residual voltage and field in the generator G. The contacts N5 also open to prepare the system for subsequent operation.

If the elevator car overruns the first floor for a predetermined distance, such as three-quarters of an inch or more, the leveling inductor relay 1L leaves the associated inductor plate P2 sufficiently to permit closure of the contacts 1UL. In closing, these contacts energize the up leveling relay LU. The contacts LU1 open but have no effect on the operation of the system. The contacts LU2 close to establish the following circuit for the up direction switch U,

B1, 65, 67, D5, U, TL, LU2, LD2, H1, B2

The contacts LU3 open and the contacts LU4 and LU5 close, but these have no effect on the immediate system operation.

The energization of the up direction switch U closes contacts U1 and U2 to connect the source of speed voltage represented by the conductors 69 and 71 to the conductors 63 and 57 with proper polarity for up travel of the elevator car. The contacts U3 and U4 close to connect the generator field winding GF2 to the associated thyratrons with proper polarity for up travel of the elevator car C. The contacts U6 open to prevent energization of the down direction switch D, and the contacts U5 close to connect the holding relay 1 and the auxiliary car running relay N in parallel with the up direction switch U for energization.

Closure of the contacts 1—1 has no effect on the system of operation. Closure of the contacts 1—2 also has no effect for the reason that the contacts 2UL are open.

Since the system now is connected for slow speed up travel of the elevator car, the car moves in an upward direction. When the car returns within three-quarters of an inch of the first floor, the leveling inductor relay 1L cooperates with its associated inductor plate P2 to open the contacts 1UL. Opening of the contacts 1UL deenergizes the up leveling relay LU. The contacts LU1 and LU3 close, whereas the contacts LU2, LU4, and LU5 open. In opening, the contacts LU2 deenergize up direction switch U and the relays 1 and N. The contacts 1—1 and 1—2 return to their open condition. The contacts U1 and U2 open to disconnect the conductors 69 and 71 from the conductors 57 and 63. The contacts U3 and U4 open to isolate the generator field winding GF2. The contacts U5 open and the contacts U6 close to prepare the system for subsequent operation.

The relay N closes its back contacts N1 and opens its front contacts N4. The opening of the contacts N4 results in application of the brake to bring the car to a stop accurately at the first floor. The contacts N5 open to complete a restoration of the system for subsequent operation.

By reference to Fig. 1, it will be noted that a resistor 102 is connected between the negative terminal of the voltage divider 59 and the conductor 57. The resistor 102 has a resistance value which is so large that it has a negligible effect on the normal operation of the system. For example, a resistor 102 having a value of one-half megohm was found suitable for an elevator system embodying the invention, and was much larger in resistance value than the resistance value of the error circuit.

If the circuits which normally determine the voltages applied between the conductors 57 and 49 become ineffective because of failure of one of the contacts U1, D1, U2 or D2 to close when it should close or for any other reason, the thyratrons are prevented from firing to produce an excessive motor speed by the negative bias supplied thereto through the resistor 102. This bias corresponds to the voltage between the conductor 61 and the negative terminal of the voltage divider 59. The bias prevents possible excessive-speed operation of the elevator car.

Although the invention has been described with reference to certain specific embodiments thereof, such embodiments are presented in an illustrative rather than a limiting sense. Numerous modifications of the system are possible falling within the spirit and scope of the invention.

I claim as my invention:

1. In an elevator system for a structure having floors, an elevator car, a driving motor, means mounting the elevator car for movement by the driving motor relative to the structure to serve the floors, and a speed controller comprising pattern means for supplying a reference pattern for energizing the motor, means for comparing the motor speed with the reference pattern and for energizing the motor in accordance with the difference between the reference pattern and the motor speed, means responsive to arrival of the elevator car substantially at a predetermined distance from a floor at which it is to stop for changing the reference pattern to a first value suitable for slowing the elevator car, and means responsive to the lapse of a predetermined time measured from said change in the reference pattern for further changing the reference pattern to a second value suitable for further slowing the elevator car, and time-constant means providing an electrical circuit having a time constant for controlling the rate at which each of the changes in pattern voltage is effected.

2. A system as claimed in claim 1 in combination with means effective when the elevator car is to be started for giving the reference pattern a third value suitable for accelerating the elevator car, and means responsive to a predetermined energization of the driving motor for giving the reference pattern a fourth value suitable for further accelerating the elevator car.

3. A system as claimed in claim 2, wherein said time-constant means comprises means for controlling the rate at which the last-mentioned change in the reference pattern is effected.

4. In a variable-voltage system, an electrical motor having an armature, an electrical generator having an armature, connections connecting the armatures in a loop circuit, a source of a pattern quantity, means for deriving a speed quantity representative of the speed of the motor, means controlled by the pattern quantity and the speed quantity for exciting the generator to maintain substantially a predetermined relationship between the speed quantity and the pattern quantity, means for successively and discontinuously changing the value of one of said quantities, a plurality of times, and means establishing a time-constant network continuously effective during each of said successive discontinuous changes for making the effect of such changes on the excitation of the generator substantially more continuous than the discontinuous changes.

5. In an electrical system, a motor, connections for deriving from the motor a voltage representative of the terminal motor voltage, adjustable compensating connections for combining with the voltage a compensating voltage proportional to the motor armature current to obtain a resultant voltage proportional to the motor counter-electromotive-force, said compensating connections including a network having a permanently effective time constant for improving the transition between successive adjustments of the compensating voltage, and for decreasing the effect of changes in system conditions of short duration on said resultant voltage.

6. A system as claimed in claim 5 in combination with a generator having an armature, said motor having an armature and a field winding, connections connecting the armatures in a loop circuit for establishing a variable-voltage drive, a source of pattern voltage, and means responsive to the pattern voltage and the resultant voltage for exciting the generator to maintain a predetermined relation between the pattern voltage and the resultant voltage, said network being effective during constant speed and variable speed operation of the motor for providing damping therefor.

7. In an elevator system for a structure, an elevator car, means mounting the car for movement relative to the structure, a motor for moving the elevator car, a control device comprising main electrodes and a control electrode for controlling current passing between the main electrodes, means for energizing the motor in accordance with current passing between the main electrodes, biasing means for biasing the control electrode relative to the main electrodes for preventing current flow between the main electrodes and activating means for energizing the control electrode relative to the main electrodes for establishing a desired current between the main electrodes, whereby when said activating means is ineffective for establishing a desired current between the main electrodes, said biasing means prevents excessive energization of the motor.

8. In a variable-voltage electrical system, a generator having an armature, a motor having an armature, connections connecting the armatures in a loop circuit, a grid-controlled device, means for exciting the generator in accordance with the output of said device, a grid-control circuit for said device, bias means for applying to the grid-control circuit a permanent bias for limiting the output of said device, and an error circuit for applying to the grid-control circuit of the device an error voltage representing the deviation of the motor speed from a predetermined pattern, said error circuit when in operating condition rendering the permanent bias means ineffective to control said device.

9. A system as claimed in claim 8, wherein the bias means comprises a high-resistance circuit and said error circuit comprises a relatively low-resistance circuit.

10. A system as claimed in claim 8, wherein the device comprises a full-wave rectifier, in combination with means connecting the rectifier for energization from an alternating current circuit, said generator having a field winding connected for energization by the rectifier.

11. In a motor control system, an electric motor, a speed controller for the motor comprising speed-measuring means for producing a first quantity representative of the speed of the motor, pattern means for providing a second quantity representative of the desired speed of the motor, and speed regulating means responsive to the difference between said quantities for regulating the speed of the motor, said speed regulating means including directional switch means for correctly relating said quantities for each direction of rotation of the motor, and means effective upon failure of said directional switch means to establish the desired relationship between the quantities for biasing said speed controlling means to maintain the speed of the motor below an unsafe value.

ALVIN O. LUND.

REFERENCES CITED

The following references are of record in the file of this patent:

UNITED STATES PATENTS

| Number | Name | Date |
| --- | --- | --- |
| 1,884,446 | White et al. | Oct. 25, 1932 |
| 2,508,179 | Lund et al. | May 16, 1950 |